United States Patent [19]
Geiger

[11] Patent Number: 6,099,449
[45] Date of Patent: Aug. 8, 2000

[54] PROCESS AND MACHINE TOOL FOR MACHINING WORKPIECES WITH TWO WORK SPINDLES

[75] Inventor: Dietrich Geiger, Grossbottwar, Germany

[73] Assignee: Hüller Hille GmbH, Ludwigsburg, Germany

[21] Appl. No.: 09/142,353

[22] PCT Filed: Jan. 23, 1997

[86] PCT No.: PCT/EP97/00296

§ 371 Date: Nov. 4, 1998

§ 102(e) Date: Nov. 4, 1998

[87] PCT Pub. No.: WO97/32689

PCT Pub. Date: Sep. 12, 1997

[30] Foreign Application Priority Data

Mar. 5, 1996 [DE] Germany .......................... 196 08 350
Mar. 5, 1996 [DE] Germany .......................... 296 04 045

[51] Int. Cl.[7] ................................................. B23Q 3/155
[52] U.S. Cl. ................................. 483/56; 408/46; 408/53
[58] Field of Search ....................... 408/46, 53; 409/203, 409/217, 213; 483/54, 55, 56, 3

[56] References Cited

U.S. PATENT DOCUMENTS

| 2,757,560 | 8/1956 | Ridgway | 408/46 |
| 4,730,373 | 3/1988 | Senoh | 408/46 |
| 5,336,025 | 8/1994 | Ozawa et al. | 408/46 |
| 5,343,604 | 9/1994 | Takagi | 29/27 |

FOREIGN PATENT DOCUMENTS

| 62-138 515 | 9/1987 | Japan . |
| 685 609 | 8/1995 | Switzerland . |

*Primary Examiner*—Stephen F. Gerrity
*Assistant Examiner*—Adrian M. Wilson
*Attorney, Agent, or Firm*—McGlew and Tuttle, P.C.

[57] ABSTRACT

A process and machine tool for machining workpieces with two parallel work spindles fitted on a headstock. The distance between the work spindles is altered with the aid of a driven adjuster. The machine tool for machining workpieces, especially for numerically controlled machining centers, has two work spindles (1, 2) fitted parallel to each other on a headstock (3), where at least one work spindle (2) can be adjusted perpendicularly to its axis.

12 Claims, 3 Drawing Sheets

6,099,449

PROCESS AND MACHINE TOOL FOR MACHINING WORKPIECES WITH TWO WORK SPINDLES

FIELD OF THE INVENTION

The invention relates to a machine tool, especially for numerically controlled machining centers, for machining workpieces with work spindles arranged in parallel to one another at a headstock, wherein the distance between the work spindles at right angles to their axes of rotation is adjustable.

BACKGROUND OF THE INVENTION

Twin-spindle machining centers with horizontal spindle position (e.g., Hüller Hille, nb-h-twin) or vertical spindle position (e.g., Werner DUOMATIK) with automatic tool changers but fixed spindle position have belonged to the state of the art. These machines differ from single-spindle machines by a further increase in production output while flexibility is preserved at the same time. Two workpieces are usually machined in parallel on these machines, and the workpieces are mounted on a device corresponding to the fixed distance between the spindles. The field of use of these machines is inherently limited due to the fixed distance between the spindles, and the simultaneous machining of a plurality of positions on one workpiece is possible in exceptional cases only. Changing the distance between the spindles on these machines results in high costs.

Another drawback of machines with fixed distance between the spindles is the change in the distance between the spindles, which is always present, is caused by heating and can be controlled to a limited extent only even by prior-art compensation measures, e.g., cooling.

Since the prior-art twin spindles have a common drive, it is also impossible to work with tools with different diameters at the same time, because it is often impossible in this machine design to compensate the inherently different circumferential velocities via adapted spindle speeds.

A machine tool with two work spindles which can be moved separately from one another in the vertical direction, wherein each spindle is fastened to separately driven, vertically movable devices, has been known from U.S. Pat. No. 5,336,025. This design is highly complicated and expensive. This is also true of the design according to JP 62138515 U, in which two work spindles located one on top of another can be moved independently from one another in the vertical direction via separately, vertically arranged spindles.

Furthermore, the supplying with tools of these twin spindles with, e.g., two tool magazines with horizontal arrangement of the spindles or chain magazines with two to four tool grippers in one transfer arm with vertical arrangement of the twin spindles is associated with considerable costs.

SUMMARY AND OBJECTS OF THE INVENTION

The primary object of the present invention is to propose a machine tool of this class, which is suitable for the parallel machining of e.g., holes on one or more workpieces, which also have different diameters, and which make possible a simple, simultaneous tool change in all work spindles.

According to the invention a machine tool is provided which is especially for numerically controlled machining centers, for machining workpieces with work spindles arranged in parallel to one another at a headstock. The distance between the work spindles at right angles to their axes of rotation is adjustable. A work spindle is mounted rigidly in the housing of the headstock and at least one second work spindle is fastened in a carriage. The carriage surrounds the stationary work spindle in a U-shaped pattern and has guide beads at the open legs. The guide beads are mounted displaceably in guide elements rigidly connected to the housing of the headstock.

At least one bracket may be provided connected to an adjusting device. The bracket may be fastened on the side to the guide beads and/or the carriage.

According to another aspect of the invention, a machine tool is provided which is especially for numerically controlled machining centers for machining workpieces. The machine tool has two work spindles arranged in parallel to one another at a headstock with axial distance between the axes. A magazine disk with a central axis of rotation parallel to the axis of the spindle is associated with the headstock with the two work spindles arranged in parallel to one another. Two tool holders each are arranged in pocket-like openings. The two tool holders are arranged on two concentrically mounted pitch circles within the external diameter of the magazine disk. The two tool holders have an angle pitch which is shifted in relation to one another such that the distance between the two tool holders belonging together corresponds to the distance between the two work spindles.

The magazine disk may have a sector-shaped cutout. A correspondingly shaped closing flap may be fastened to the sector-shaped cutout. The closing flap can be moved for the tool change position into the chamber in which the magazine disk is arranged rotatable.

It is proposed according to the present invention that one work spindle be arranged in a fixed position in the housing of the headstock and that at least a second work spindle be fastened in a carriage, which surrounds the stationary work spindle in a U-shaped pattern and has guide beads at the open legs, which guide beads are mounted displaceably in guide elements rigidly connected to the housing of the headstock.

This adjustment of the distance between the work spindles can thus be performed both continuously and intermittently before every individual machining process. A correction of the distance between the axes can also be automatically performed after determining certain deviations in dimensions, without an operator having to intervene from the outside.

To machine workpieces especially with two or even two groups of work spindles arranged in parallel to one another at a headstock, at least one work spindle may be arranged adjustably at right angles to its axis of rotation. However, both spindles or even both groups of spindles may also be arranged adjustably in the housing of the headstock.

In the usual arrangement of two motor spindles arranged next to each other or one on top of another, the adjustable spindles may be connected in the direction of adjustment with vertically or horizontally arranged guide beads and be mounted adjustably in relation to the housing in guide elements fastened rigidly to the housing. It has been found to be favorable in this connection for the adjustable spindle to be mounted in a U-shaped carriage, wherein the guide beads are arranged at the free legs and are mounted slidingly in corresponding guide elements. A bracket, which is in turn connected to an adjusting device extending in parallel to the carriage or the guide beads, may be fastened on the outside to the U-shaped carriage and/or to the guide beads on one side or on both sides.

Due to the adjustability of the distance between the two spindles or spindle groups according to the present invention, a very extensive adaptation of the machining center to different workpieces is possible, without the need for any major modifications. The machining unit can be correspondingly adapted with the device according to the present invention even in the case of major dimensional inaccuracies of a series of otherwise identical workpieces.

In addition, as is described in greater detail below, the machine tool may be provided with a special magazine disk, in which the tools of the headstock can be placed into and taken over from corresponding tool holders of the magazine disk simultaneously.

A sector-shaped cutout arranged in the magazine disk may correspond, e.g., to the outer contour of the working area of the machine, without it having to be additionally displaced in the x or y direction.

A correspondingly shaped closing flap, which forms a closed chamber together with the rest of the cover of the magazine in the machining position, is preferably fastened to the sector-shaped cutout of the magazine disk. When the magazine disk is turned into the tool change position, the closing flap is turned into or out of the chamber and the latter is opened or closed as a result.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
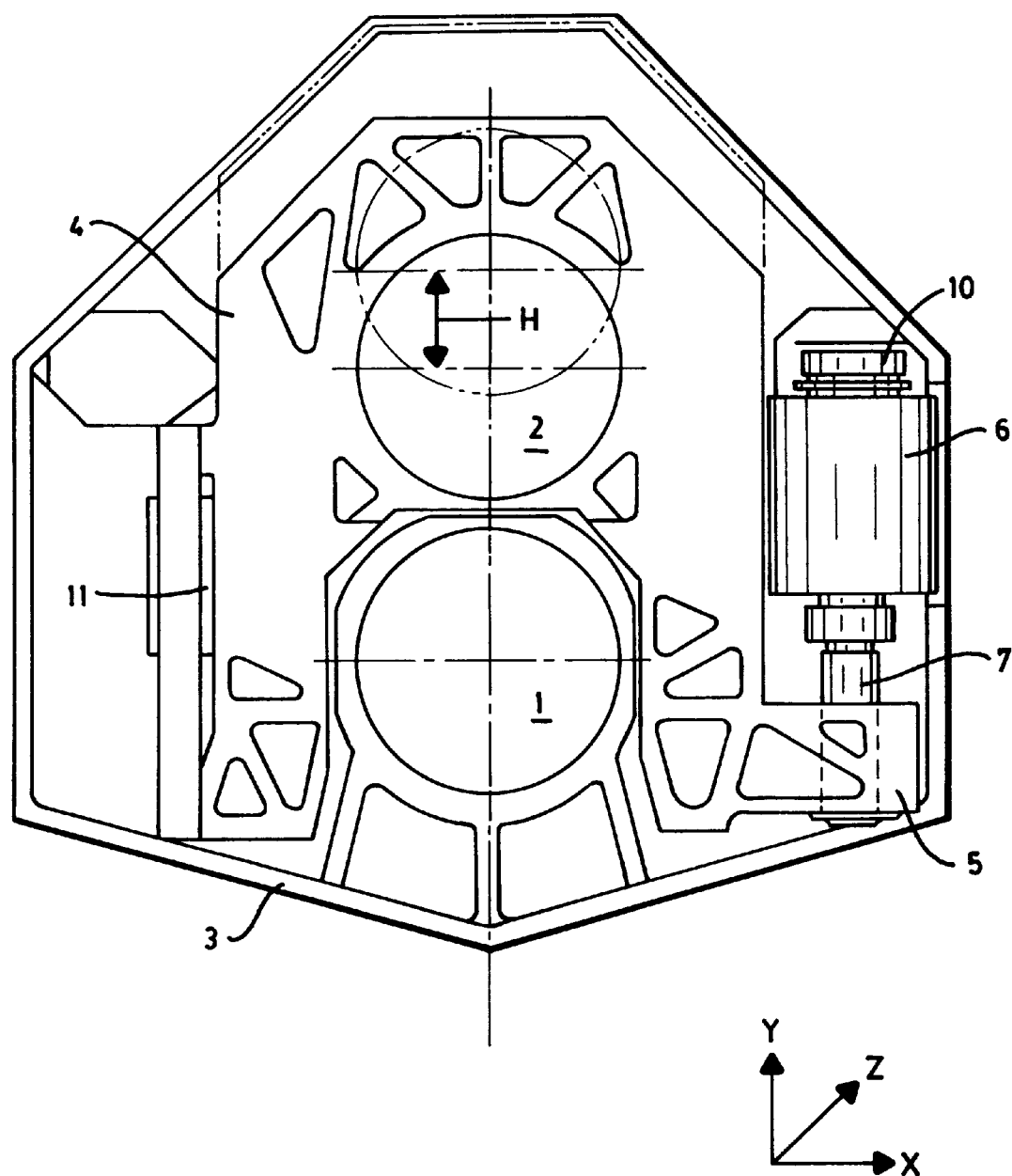
FIG. 1 is a side view of the arrangement of two work spindles in a headstock.
Figure 2:
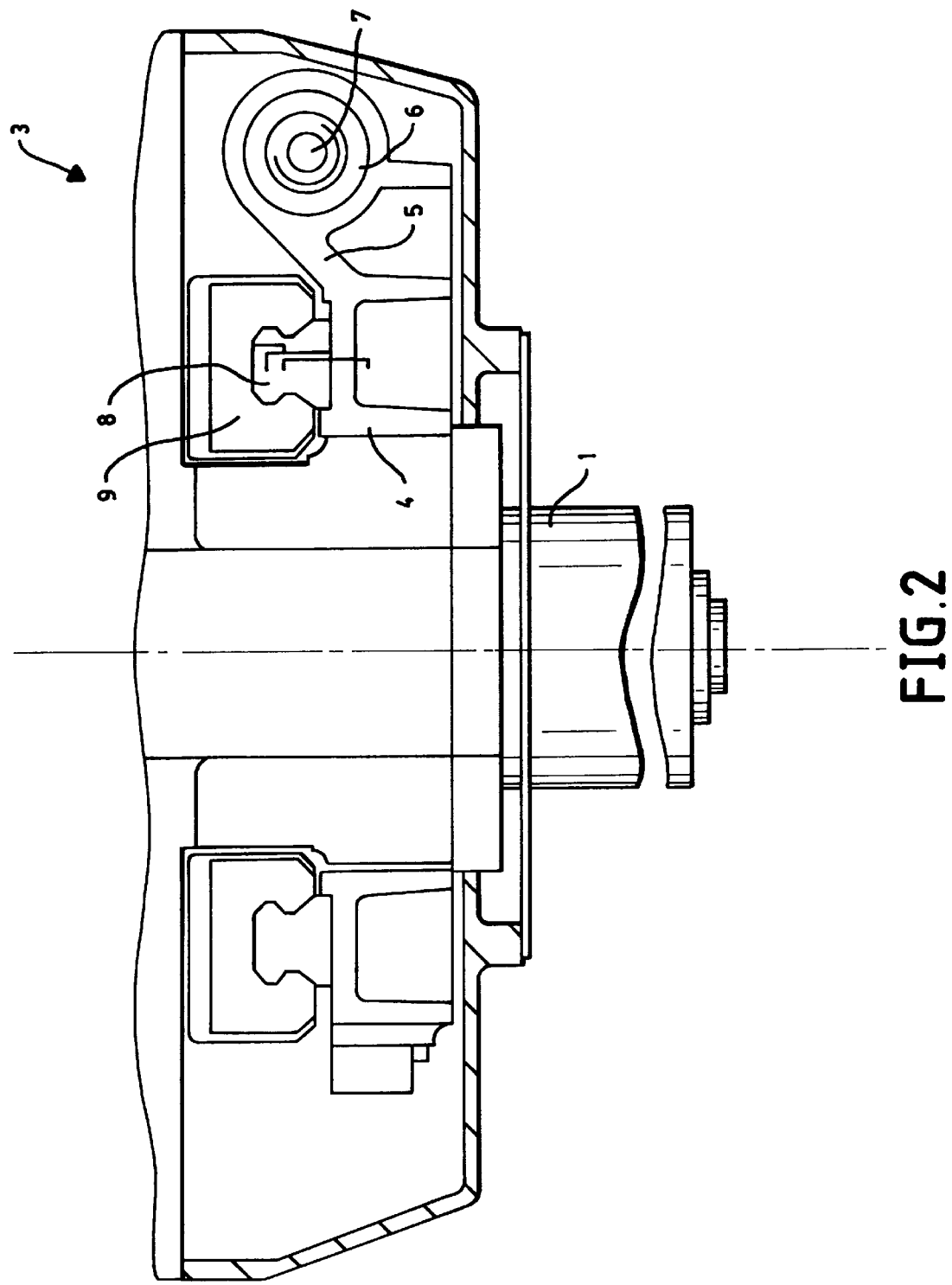
FIG. 2 is a vertical sectional view of the device shown in FIG. 1.

Referring to the drawings in particular, FIG. 1 shows the headstock 3 with the two work spindles 1, 2. The headstock 3 is displaceable as a whole in the x and y directions in the usual manner, while the two work spindles 1, 2 designed as motor spindles are moved for machining in the z direction. The work spindle 1 is mounted radially rigidly in the housing of the headstock 3. The drive spindle 2 is mounted in a U-shaped carriage 4 with two free ends or open legs. The drive spindle 2 can be adjusted together with the carriage 4 by the stroke H. To ensure this, the carriage 4 has guide beads 8 at its two free ends. The guide beads 8 are moved in the guide element 9 of the housing of the headstock 3. A bracket 5 is connected to the housing 3 via an adjusting device 6. The bracket 5 is arranged on the outside at one arm of the carriage 4. A belt drive 10, a gear change box and a ball roll spindle 7 belong to the adjusting device 6. In addition, a scale 11 for monitoring the path of adjustment of the work spindle 2 in relation to the work spindle 1 is arranged on the side of the carriage 4 facing away from the bracket 5.

Figure 3:
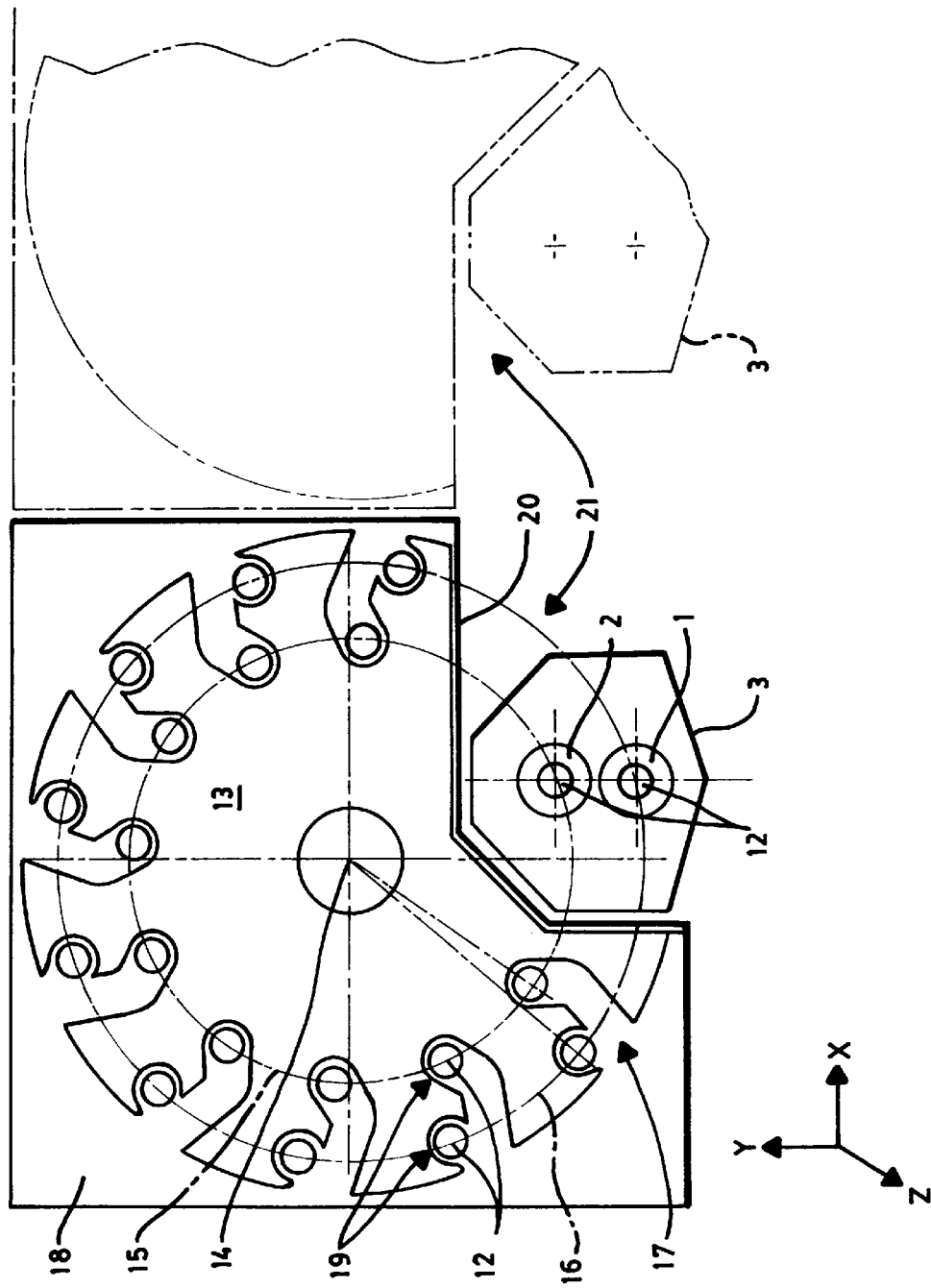
FIG. 3 is a side view of the magazine disk according to the present invention.

FIG. 3 shows two magazine disks 13 for a machining center, but one magazine disk is sufficient, in principle. Half of FIG. 3 is therefore shown by broken line only to indicate that the magazine disk 13 may also be arranged either on the left-hand side or on the right-hand side only. The headstock 3 may be displaced in the x and y directions. The tool change takes place in the position of the headstock 3 shown (top left or bottom left in FIG. 3). The magazine disk 13 is first rotated for this purpose around its central axis of rotation 14, while the closing flap 20 fastened to the magazine disk 13 is rotated into the chamber within the magazine cover 18 until a pocket-like opening 17 and the corresponding tool holders 19 are ready to receive or release the tools 12 from or to the headstock 3. The two tool holders 12 at the magazine disk 13 for receiving the two tools 12 are always arranged on concentrically arranged pitch circles 15 and 16 within pocket-like openings 17 arranged in the circumferential area of the magazine disk 13. The tool holders 19 on the inner and outer pitch circles 15 or 16 are arranged rotated by a certain angle around the axis of rotation 14 in relation to one another such that the distance between two tool holders 19 corresponds to the distance between the two work spindles 1, 2.

While specific embodiments of the invention have been shown and described in detail to illustrate the application of the principles of the invention, it will be understood that the invention may be embodied otherwise without departing from such principles.

What is claimed is:

1. A machine tool, for numerically controlled machining centers for machining workpieces, comprising;

a headstock with a housing;

two work spindles arranged in parallel to one another at said headstock with an axial distance between axes of said two work spindles;

a magazine disk associated with said headstock, said magazine disk having a central axis of rotation parallel to the axis of the spindle;

two tool holders each arranged in a respective one of pocket-like openings of said magazine disk, said two tool holders being arranged on two concentrically mounted pitch circles inwardly of an external diameter of said magazine disk and said two tool holders having an angle pitch which is shifted in relation to one another such that the distance between said two tool holders belonging together corresponds to the distance between said two work spindles.

2. The machine tool in accordance with claim 1, wherein said magazine disk has a sector-shaped cutout.

3. The machine tool in accordance with claim 2, wherein a correspondingly shaped closing flap is fastened to said sector-shaped cutout.

4. The machine tool in accordance with claim 3, wherein said closing flap can be moved for a tool change position into a chamber in which said magazine disk is arranged rotatably.

5. A machine tool for machining workpieces, comprising:

a headstock with a housing, said housing having rigidly connected guide elements;

two work spindles arranged in parallel to one another at said headstock, wherein the distance between the work spindles at right angles to their axes of rotation is adjustable, one of said work spindles being mounted rigidly in said housing of said headstock; and a carriage, at least a second work spindle being fastened in said carriage, said carriage surrounding said rigidly mounted work spindle in a U-shaped pattern with open legs, said open legs including guide beads being mounted displaceably in said guide elements rigidly connected to said housing of said headstock.

6. The machine tool in accordance with claim 5, further comprising:

at least one bracket connected to an adjusting device, said bracket being fastened on a side to said carriage.

7. The machine tool in accordance with claim 6, further comprising:

at least one bracket connected to an adjusting device, said bracket being fastened on a side to said guide beads.

8. The machine tool in accordance with claim 5, further comprising:

a magazine disk associated with said headstock, said magazine disk having a central axis of rotation parallel to the axis of one of said work spindles, said two work spindles being arranged in parallel to one another;

two tool holders each arranged in a respective one of pocket-like openings of said magazine disk, said two tool holders being arranged on two concentrically mounted pitch circles inwardly of an external diameter of said magazine disk and said two tool holders having an angle pitch which is shifted in relation to one another such that the distance between said two tool holders belonging together corresponds to the distance between said two work spindles.

9. The machine tool in accordance with claim 8, wherein said magazine disk has a sector-shaped cutout.

10. The machine tool in accordance with claim 9, wherein a correspondingly shaped closing flap is fastened to said sector-shaped cutout.

11. The machine tool in accordance with claim 10, wherein said closing flap can be moved for a tool change position into a chamber in which said magazine disk is arranged rotatably.

12. The machine tool in accordance with claim 5, further comprising:

at least one bracket connected to an adjusting device, said bracket being fastened on a side to said guide beads.

\* \* \* \* \*